US008344876B2

(12) United States Patent
Brown

(10) Patent No.: US 8,344,876 B2
(45) Date of Patent: Jan. 1, 2013

(54) REMOTE MOTION MONITORING SYSTEM

(75) Inventor: Stephen J. Brown, Woodside, CA (US)

(73) Assignee: Health Hero Network, Inc., Palo Alto, CA (US)

( * ) Notice: Subject to any disclaimer, the term of this patent is extended or adjusted under 35 U.S.C. 154(b) by 398 days.

(21) Appl. No.: 12/047,397

(22) Filed: Mar. 13, 2008
(Under 37 CFR 1.47)

(65) Prior Publication Data
US 2009/0273444 A1 Nov. 5, 2009

(51) Int. Cl.
*G08B 1/08* (2006.01)
(52) U.S. Cl. ................................ 340/539.13; 600/595
(58) Field of Classification Search .................. 340/825, 340/10.1, 500, 531, 539.1, 539.11–539.13, 340/286.07, 572.1, 10, 539; 600/595
See application file for complete search history.

(56) References Cited

U.S. PATENT DOCUMENTS

| | | | | |
|---|---|---|---|---|
| 5,115,224 A * | 5/1992 | Kostusiak et al. | ............. | 340/574 |
| 5,652,570 A * | 7/1997 | Lepkofker | ................. | 340/573.4 |
| 5,945,985 A | 8/1999 | Babin et al. | | |
| 6,259,372 B1 * | 7/2001 | Taranowski et al. | .......... | 340/683 |
| 7,047,114 B1 | 5/2006 | Rogers | | |
| 7,113,091 B2 * | 9/2006 | Script et al. | .................... | 340/546 |
| 7,301,451 B2 * | 11/2007 | Hastings | .................. | 340/539.12 |
| 7,400,259 B2 * | 7/2008 | O'Connor et al. | .......... | 340/573.1 |
| 7,443,301 B2 * | 10/2008 | Tucker et al. | ............. | 340/572.8 |
| 7,554,445 B2 * | 6/2009 | Script et al. | ................ | 340/545.1 |
| 7,610,813 B2 * | 11/2009 | Hughes et al. | .................. | 73/777 |
| 8,081,082 B2 * | 12/2011 | Malik et al. | ................. | 340/573.1 |
| 2004/0112151 A1 * | 6/2004 | Maxwell et al. | ............. | 73/865.4 |
| 2004/0233101 A1 | 11/2004 | Kim | | |
| 2005/0013417 A1 | 1/2005 | Zimmers et al. | | |
| 2005/0248454 A1 | 11/2005 | Hanson et al. | | |
| 2005/0264423 A1 * | 12/2005 | Hartmann | .................. | 340/572.8 |
| 2006/0022833 A1 * | 2/2006 | Ferguson et al. | .......... | 340/573.1 |
| 2006/0095173 A1 | 5/2006 | Knoska et al. | | |
| 2006/0138225 A1 * | 6/2006 | Richley et al. | ................ | 235/385 |
| 2006/0176193 A1 | 8/2006 | Wraight | | |
| 2006/0238347 A1 * | 10/2006 | Parkinson et al. | ......... | 340/572.4 |
| 2006/0282021 A1 * | 12/2006 | DeVaul et al. | ................ | 600/595 |
| 2007/0085690 A1 * | 4/2007 | Tran | ........................... | 340/573.1 |
| 2007/0139055 A1 * | 6/2007 | Cockrill | ........................ | 324/528 |
| 2007/0178945 A1 * | 8/2007 | Cook et al. | ................... | 455/572 |
| 2007/0182578 A1 * | 8/2007 | Smith | .......................... | 340/669 |
| 2007/0229252 A1 * | 10/2007 | Collins et al. | ............. | 340/539.13 |
| 2007/0247306 A1 * | 10/2007 | Case, Jr. | .................... | 340/539.11 |
| 2008/0082025 A1 * | 4/2008 | Hughes et al. | ............... | 600/595 |
| 2008/0274713 A1 * | 11/2008 | Rofougaran | .................. | 455/334 |
| 2009/0212941 A1 * | 8/2009 | Vock et al. | ................ | 340/539.32 |
| 2009/0284368 A1 * | 11/2009 | Case, Jr. | ..................... | 340/539.1 |
| 2010/0011872 A1 * | 1/2010 | Hughes et al. | ................... | 73/777 |
| 2010/0201512 A1 * | 8/2010 | Stirling et al. | ........... | 340/539.11 |

* cited by examiner

*Primary Examiner* — Brian Zimmerman
*Assistant Examiner* — An T Nguyen
(74) *Attorney, Agent, or Firm* — Rahman LLC

(57) ABSTRACT

A system, apparatus, and method for motion monitoring. In an embodiment, a plurality of self-powered active Radio Frequency Identification (RFID) transmitters are each configured to intermittently transmit radio frequency pulse at a rate proportional to motion, containing identification information. The pulse produced by each of the RFID transmitters are received and analyzed at a receiver. The analysis results in the identification of pattern of activity, which is used to produce meaningful data regarding the motion of a user. The RFID transmitters may be provided on a wearable tag.

20 Claims, 4 Drawing Sheets

REMOTE MOTION MONITORING SYSTEM

BACKGROUND

1. Technical Field

The embodiments herein relate generally to remote motion monitoring and, more particularly to, motion monitoring using Radio Frequency identification (RFID).

2. Description of the Related Art

Remote monitoring and tracking of logistics has been essential in providing detailed information on the movement of inventory. Radio Frequency identification (RFID) technology has been widely used in such applications. Early use of the technology was in the form of passive RFID devices. In such passive RFID applications, the passive RFID device is inscribed into or attached onto the inventory. A receiver is generally used to track the movement of the inventory. However, the passive RFID may allow only limited range of operation since they are not supplied with a power source. Active RFID devices are provided with a power source, which may allow long-range applications. However, active RFID devices may have an inherent limitation that the power source needs to be replaced.

In order to overcome certain limitations of active RFID a contactless programmable electrostatic RFID system is provided in International Patent Application WO0016283, the complete disclosure of which, in its entirety is herein incorporated by reference. The contactless programmable electrostatic RFID system comprises of a reader/encoder with an exciter and a transceiver. Using the high quality "Q" resonator circuit, high voltages can be efficiently produced to generate required electrostatic exciter signals. The combination of a high quality "Q" piezoelectric element and a capacitor in series resonance is connected to switches with switching logic to cause the flow of alternating current through the resonator combination at the resonant frequency. The exciter, in this way, converts a low voltage, low current DC input signal into a high voltage, lower current output signal using only the piezoelectric element and a capacitor. The low power consumption of this type of exciter facilitates a battery-operated implementation.

However, the application of RFID technology in applications such as Medicare may require specialized equipments. Active RFID used in such applications may require replacement, which may render the applications ineffective considering periodic removal of equipment or devices. Further, specialized calibration process may be required when used in healthcare applications, whereby remote monitoring and analysis of a user may not be efficiently made possible. Furthermore, detailed analysis of a user using remote monitoring may require enhanced information for accurate analysis. Therefore, there is a requirement of an enhanced, yet cost-effective system for motion monitoring.

SUMMARY

The embodiments herein provide a system, apparatus, and method for motion monitoring. In one embodiment, a plurality of self-powered active Radio Frequency Identification (RFID) transmitters are each configured to intermittently transmit radio frequency pulse at a rate proportional to motion, containing identification information. The pulse produced by each of the RFID are received and analyzed at a receiver. The analysis results in identification of pattern of activity, which is used to produce meaningful data regarding the motion of a user. A server may be provided for receiving meaningful data from the receiver for producing reports after analysis. Reports may be made available to the user through the World Wide Web.

One embodiment herein provides a self-powered apparatus for transmitting motion information that may be worn by a user on a wearable tag. Another aspect of the embodiments herein allows enhanced power management by transmitting RF pulses only when the user is active. Remote monitoring of motion to identify the type of activity performed by the user is provided. This allows for application of the embodiments provided herein in various healthcare applications. In another embodiment the self-powered active RFID transmitters may be used to identify a user in a network of users. One application of such an embodiment may be provided in military applications where the motion of various soldiers may be monitored remotely.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE PREFERRED EMBODIMENTS

Figure 1:
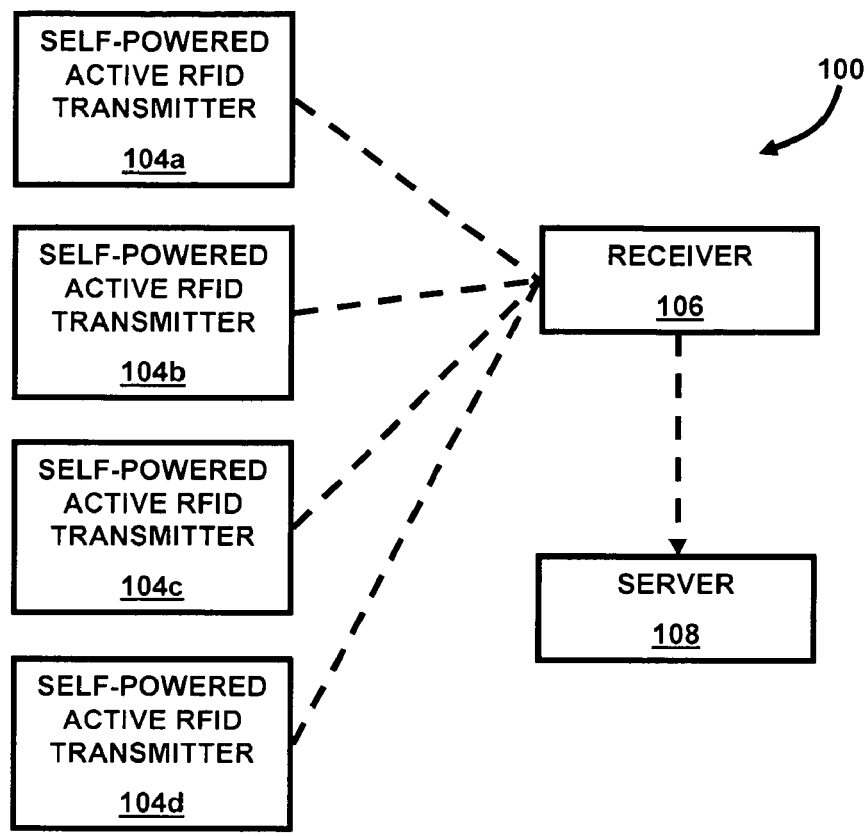
FIG. 1 is a block diagram illustrating a motion monitoring system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for an enhanced, yet cost-effective system for motion monitoring. The embodiments herein achieve this by providing a plurality of self-powered active RFID transmitters that are each configured to intermittently transmit RF pulses at a rate proportional to the motion of a user, whereby the RF pulses contain identification information. The RF pulse produced by each of the RFID transmitters are received and analyzed at a receiver. The analysis results in the identification of a pattern of activity, which is used to produce meaningful data regarding the motion of a user.

One embodiment herein provides a self-powered apparatus for transmitting motion information that may be worn by a user on a wearable tag. Another aspect of the embodiments herein allows enhanced power management by transmitting RF pulses only when the user is active. Remote monitoring of patients in healthcare applications may also be provided. Referring now to the drawings, and more particularly to FIGS. 1 through 4, where similar reference characters denote corresponding features consistently throughout the figures, there are shown preferred embodiments.

FIG. 1 illustrates a general block diagram of a motion monitoring system 100 according to an embodiment herein. A plurality of self-powered active RFID transmitters 104a-104d may be provided. The RFID transmitters 104a-104d are adapted to intermittently transmit RF pulses at a rate proportional to motion. In one embodiment the RFID transmitters 104a-104d may be placed at various parts of a user's body (not shown).

Each RFID transmitter 104a-104d may be adapted to produce a RF pulse with identifying information that is unique to that particular RFID transmitter 104a-104d. This enables distinguishing the RF pulses of the RFID transmitters 104a-104d when RF pulses from a number of RFID transmitters 104a-104d are being transmitted. A receiver 106 may be adapted to receive the RF pulse produced by the RFID transmitters 104a-104d. The receiver 106 may further analyze the RF pulse produced by each of said RFID transmitters 104a-104d to identify the pattern of activity. This analysis may produce meaningful data containing information on the pattern of activity and other details characterizing the pattern of activity. In this regard, the analysis which takes place in the receiver 106 produces the meaningful data based on a comparison with earlier and predefined patterns of activity data. Accordingly, in the context of the embodiments herein, meaningful data represents data that describes the pattern of activity compared with a standard, predefined description of that pattern of activity. Preferably, the meaningful data is capable of being quantified in some numeric manner such as a rating or percentage or by logic means.

In one embodiment the RFID transmitters 104a-104d may be positioned on various parts of a user's body. Motion monitoring by each of the transmitters 104a-104d may be used to identify the pattern of the activity such as running, walking, cycling, etc. that the user is currently performing. The RFID transmitters 104a-104d may be attached to wearable tags (not shown) that may be worn by the user. The meaningful information produced from the pattern of activity may enable a physician or other healthcare practitioner to suggest improvements in performing that particular activity.

The receiver 106 may be configured to qualitatively differentiate between the patterns of activity. The RF pulse received from various transmitters 104a-104d may be analyzed qualitatively to identify the pattern of activity. Furthermore, quantitative analysis of pattern of activity may also be carried out at the receiver 106 to differentiate between the patterns of activity. For example, this may occur in the following manner: the patterns of activity may be quantitatively represented in a graphical or mathematical manner and the variance of new data is compared with previously saved data and with predefined (idle) data to determine differences (over time) of the patterns of activity of the user. The receiver 106 may calibrate the RF pulse received based on the pattern of activity. Further, re-calibration of the RF pulse based on the pattern of activity and the user may also take place at the receiver 106. The recalibration of the pulse allows for individualization of the system 100. The system 100 may be provided with a predefined threshold value. However, the behavior of every user varies; for example, a light-level activity may actually be a medium-level activity for a user and therefore the receiver 106 is re-calibrated accordingly.

The receiver 106 may accumulate the RF pulse over a period of time for future analysis. Monitoring RF pulses over a period of time may also enable further analysis of the user and their progress over that period of time. Moreover, the meaningful data produced at the receiver 106 may be made accessible to the user. In one embodiment a server 108 may be provided to receive the meaningful data through a network (not shown), wherein the network may be a wireless network. Reports may be produced by analyzing the meaningful data at the server 108. Such reports may be made available to the user over the World Wide Web.

Figure 2:
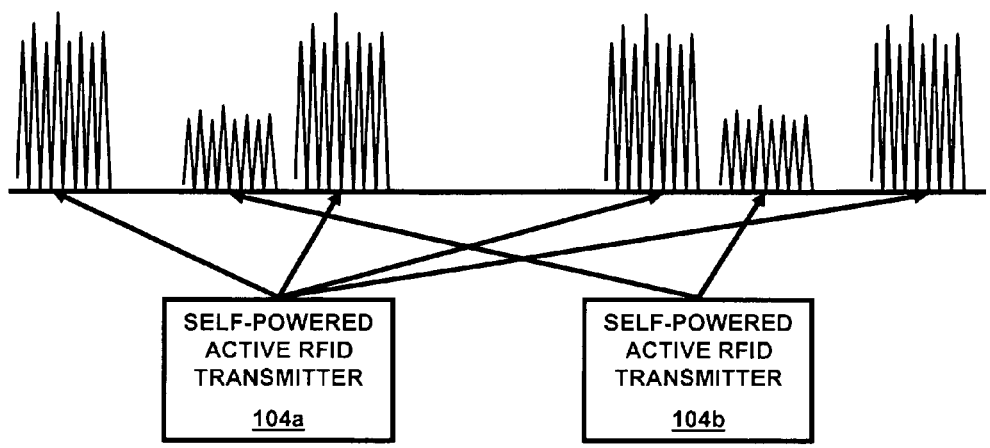
FIG. 2 illustrates a stream of the RF pulse received at the receiver according to an embodiment herein.

According to an embodiment herein, a stream of the RF pulse received at the receiver 106 (of FIG. 1) may be represented as shown in FIG. 2. In this exemplary embodiment two RFID transmitters 104a, 104b may be provided to transmit RF pulses individually, which may be received at the receiver 106 (of FIG. 1). The identification information of each RFID transmitter 104a, 104b enables the receiver 106 (of FIG. 1) to identify the RF pulse from the RFID transmitter 104a and the RFID transmitter 104b. Such RF pulses from various RFID transmitters 104a, 104b collectively enables identifying a pattern of activity of the user.

Figure 3:
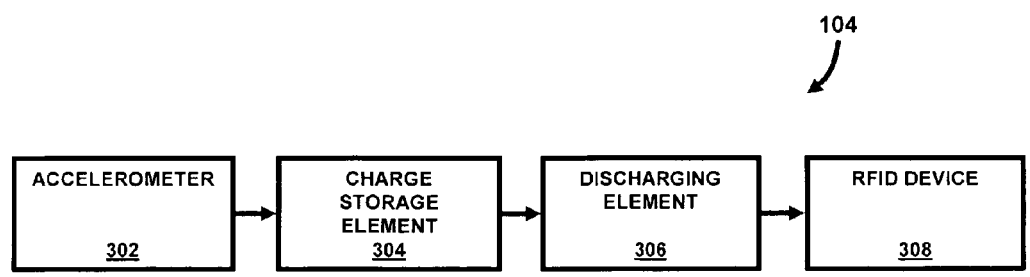
FIG. 3 illustrates a RFID transmitter for transmitting motion information according to an embodiment herein.

FIG. 3 illustrates an RFID transmitter 104 for transmitting motion information according to an embodiment herein. The RFID transmitter 104 may comprise an accelerometer 302 that senses motion to produce an electric charge. The electric charge produced is proportional to the movement. The charge so produced may be stored at a charge storage element 304 to store the electric charge up to a predefined threshold. The charge storage element may be selected based on the threshold required. For example, the charge storage element 304 may be a capacitor that may charge up to the predefined threshold. When the motion of the user increases, the electric charge in the charge storage element 304 reaches the predefined threshold quicker than if the motion of the user is slow, which then increases the frequency of transmission of the RF pulse.

A discharging element 306 to discharge the stored electric charge may be used to allow discharging of charge available in the charge storage element 304. The discharging element 306, which may be embodied as a switch or a gate, may be discharged upon reaching the predefined threshold. The predefined threshold may be so decided to allow only required motion to be monitored and ignore the casual motion, which may occur during casual activities and thus may not require monitoring. In this regard, a minimum level for the number of RF pulses may be fixed, which may be ignored as arising out of casual activities.

An RFID device 308 may be provided that produces a RF pulse with identification information and motion information upon receiving the stored electric charge. The transmission of the identification information and motion information thus occurs only when the user is involved in the motion-producing activities, which produce an electric charge beyond the predefined threshold. This aspect of the embodiments herein provides for enhanced power management. The accelerometer 302 used may be a triaxial piezoelectric accelerometer, which allows sensing of motion in three axes thereby resulting in more accurate results. Furthermore, the RFID transmitter 104 for transmitting motion information may be provided on a wearable tag (not shown).

Figure 4:
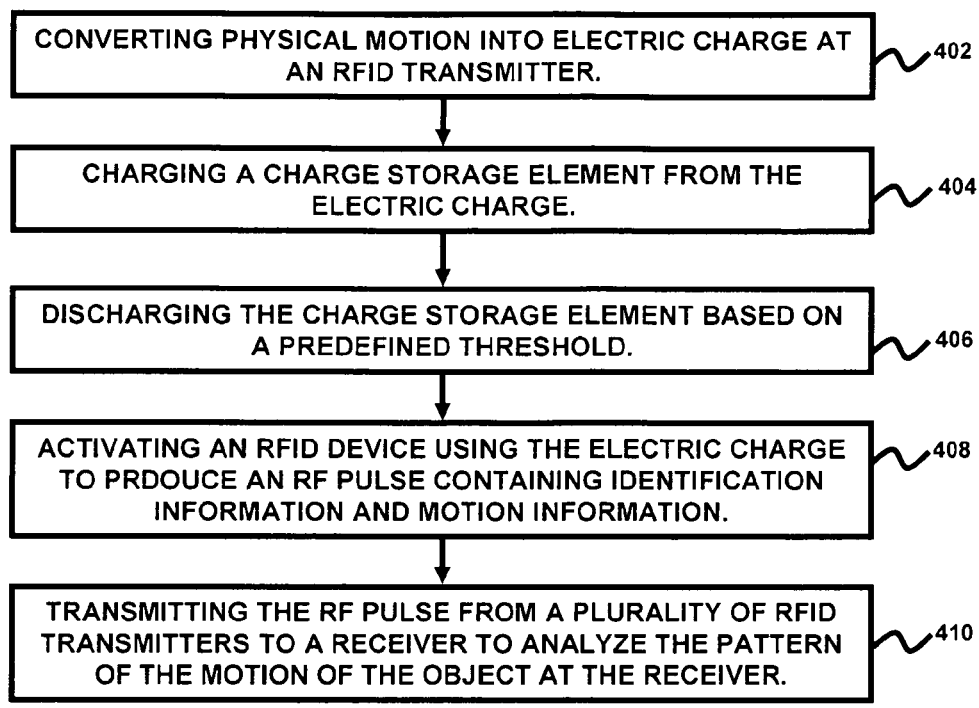
FIG. 4 illustrates a method for motion monitoring according to an embodiment herein.

A method for motion monitoring according to an embodiment herein is shown in FIG. 4, with reference to the elements shown in FIGS. 1 through 3. The method provides for motion monitoring which may be used to analyze pattern of activity of the object. In one embodiment the object may be a user.

The method may involve converting (402) physical motion of the object into electric charge at an RFID transmitter 104. The electric charge so produced is proportional to the motion. This electric charge may be used in charging (404) a charge storage element 304; for example, a capacitor. The amount of electric charge accumulated in the charge storage element 304 may depend on the value of capacitance (in the case of a capacitor).

Discharging (406) of the charge storage element 304 based on a predefined threshold may be affected. Different predefined thresholds may be provided based on the motion required to be sensed. The predefined threshold may be so decided to allow only required motion to be monitored and ignore the casual motion, which may occur during casual activities and thus may not require monitoring.

The discharging (406) of the charge storage element 304 causes the activation (408) of an RFID device 308 using the electric charge to produce an RF pulse containing identification information and motion information. The RFID device 308 may be present in the RFID transmitter 104. The RFID device 308 thus is activated only if the object is active so as to charge the charge storage element 304 up to the predefined threshold.

The RF pulse produced by each of the RFID devices 308 in the RFID transmitters 104a-104d when a plurality of such RFID transmitters 104a-104d is used, may be required to be collected. This may be affected by transmitting (410) the RF pulse from the plurality of the RFID transmitters 104a-104d to a receiver 106 to analyze the pattern of the motion of the object at the receiver 106.

The receiver 106 analyzes the RF pulse produced by each of the RFID transmitters 104a-104d to identify the pattern of activity and produce meaningful data. The calibration of the RF pulses may be performed at the receiver 106 based on the pattern of activity. Re-calibration may also be affected based on the pattern of activity and the user.

The meaningful data produced at the receiver 106 may be transmitted to a server 108 for storing and analyzing. Reports may be produced from such analysis of the meaningful data for easy reference by the user. Furthermore, the reports may be accessible through the World Wide Web.

The method herein may be used to identify various patterns of activity such as running, walking, cycling, etc. when used on a user's body. The RFID transmitter 104 may be worn by the user on a wearable tag (not shown). The accelerometer 302 used may be triaxial piezoelectric accelerometers providing sensing of motion in three axes. In another embodiment the method may be used for remote motion monitoring of soldiers in military applications.

In various embodiments herein the system and method allow efficient motion monitoring. A user may monitor his/her progress by viewing various reports produced as a result of analysis of his performance over a period of time. Easy access to such information may help user improve when used in healthcare applications.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the appended claims.

What is claimed is:

1. A motion monitoring system comprising:
   a plurality of self-powered active Radio Frequency Identification (RFID) transmitters each intermittently transmitting RF pulses at a rate proportional to motion of a user wearing said RFID transmitters, wherein each RFID transmitter transmits an RF pulse upon reaching a predefined threshold, said RF pulse comprises identification information and motion information pertaining to a pattern of activity being performed by said user, said pattern of activity being quantitatively represented in any of a graphical and mathematical manner, said user comprising a human being, and said pattern of activity comprises predefined movements performed by said user, and wherein said each RFID transmitter comprises a triaxial piezoelectric accelerometer that senses said motion of said user; and
   a receiver that receives and analyzes said RF pulses produced by each of said RFID transmitters to identify said pattern of activity and produce meaningful data characterizing said pattern of activity, wherein said receiver compares a variance in said pattern of activity with previously saved data of a previous pattern of activity of said user and with data related to a standard, predefined description of said pattern of activity to determine differences over time of the patterns of activity of said user, wherein said receiver calibrates and re-calibrates said RF pulses, wherein said receiver is calibrated and re-calibrated based on said pattern of activity being performed by said user, and wherein the re-calibration of said receiver occurs based on a specific pattern of activity of a particular user compared with said previously saved data and said predefined data.

2. The motion monitoring system of claim 1, wherein said plurality of RFID transmitters are positioned on various parts of said user.

3. The motion monitoring system of claim 2, wherein said pattern of activity comprises defined physical movements being performed by various parts of said user.

4. The motion monitoring system of claim 2, wherein said RFID transmitters positioned on a first user comprise unique said RF pulses differentiated over RF pulses transmitted by RFID transmitters positioned on a second user, wherein said first user comprises a first human being and said second user comprises a second human being.

5. The motion monitoring system of claim 1, wherein said RFID transmitters are attached to a wearable tag.

6. The motion monitoring system of claim 1, wherein said receiver records said RF pulses for future analysis.

7. The motion monitoring system of claim 1, wherein said receiver qualitatively differentiates between different patterns of activity.

8. The motion monitoring system of claim 1, further comprising a server that receives said meaningful data from said receiver.

9. The motion monitoring system of claim 8, wherein said server stores and analyzes said meaningful data over a period of time to produce reports.

10. The motion monitoring system of claim 1, further comprising:
    a charge storage element storing said electric charge up to a predefined threshold; and a discharging element discharging the stored electric charge upon reaching said predefined threshold;

wherein said RF pulses comprise wireless RF pulses comprising identification information and motion information and are transmitted by said each RFID transmitter upon receiving said stored electric charge, wherein said motion information pertains to said pattern of activity and said pattern of activity comprises predefined movements performed by said user.

11. The tag motion monitoring system of claim 10, wherein said electric charge produced is proportional to said motion of said user.

12. The tag motion monitoring system of claim 10, wherein said charge storage element comprises a capacitor.

13. The tag motion monitoring system of claim 10, wherein said discharging element comprises any of a switch and a gate.

14. A method for monitoring physical motion of a human user, said method comprising:

attaching at least one Radio Frequency Identification (RFID) transmitter worn on a body part of said human user;

converting physical motion of said human user into electric charge at the RFID transmitter;

charging a charge storage element from said electric charge;

discharging said charge storage element based on a predefined threshold;

activating an RFID device using said electric charge to produce an RF pulse comprising identification information and motion information, wherein transmission of said identification information and motion information is based on said predefined threshold;

transmitting said RF pulse from said RFID transmitter to a receiver to compare and analyze a pattern of said physical motion of said human user to a plurality of predefined patterns of activity; and comparing a variance in a pattern of activity of said user with previously saved data of a previous pattern of activity of said user and with data related to a standard, predefined description of said pattern of activity to determine differences over time of the patterns of activity of said user, wherein said receiver calibrates and re-calibrates said RF pulse, wherein said receiver is calibrated and re-calibrated based on said pattern of activity being performed by said user, and wherein the re-calibration of said receiver occurs based on a specific pattern of activity of a particular user compared with said previously saved data and said predefined data.

15. The method of claim 14, further comprising:

producing meaningful data at said receiver, wherein said meaningful data characterizes said pattern of activity;

transmitting said meaningful data to a server; and storing and analyzing said meaningful data to produce reports.

16. The method of claim 14, wherein said RFID transmitter comprises a triaxial piezoelectric accelerometer that senses said physical motion.

17. The method of claim 16, wherein the accelerometer charges said charge storage element at a level proportional to said physical motion.

18. The method of claim 15, further comprising transmitting said meaningful data for healthcare evaluation.

19. The method of claim 15, further comprising making a suggestion to improve performance of a particular pattern of activity being performed by the user based on said meaningful information.

20. The method of claim 15, wherein said meaningful data is numerically or logically quantified.

\* \* \* \* \*